(12) United States Patent
Trangsrud et al.

(10) Patent No.: US 7,727,326 B1
(45) Date of Patent: Jun. 1, 2010

(54) VARIED LENGTH FIBERS IN A BRITTLE MATERIAL

(76) Inventors: Julian P. Trangsrud, 300 Cherry St., Northfield, MN (US) 55057; Clifford N. MacDonald, 9115 Inver Grove Trail, Inver Grove Heights, MN (US) 55076

( * ) Notice: Subject to any disclaimer, the term of this patent is extended or adjusted under 35 U.S.C. 154(b) by 696 days.

(21) Appl. No.: 10/779,151

(22) Filed: Feb. 13, 2004

(51) Int. Cl.
*E04C 5/01* (2006.01)
*E04C 5/07* (2006.01)
*C04B 14/48* (2006.01)
*C04B 16/12* (2006.01)

(52) U.S. Cl. .................. 106/644; 106/724; 428/599; 428/925; 52/659

(58) Field of Classification Search .............. 428/603, 428/606, 359, 364, 369, 378, 379, 294.7, 428/373, 375, 401, 36.92, 370, 371, 361, 428/393, 400, 507; 264/8; 106/643, 644, 106/713

See application file for complete search history.

(56) References Cited

U.S. PATENT DOCUMENTS

| | | | | |
|---|---|---|---|---|
| 3,616,589 | A * | 11/1971 | Sherard | 52/659 |
| 3,836,412 | A * | 9/1974 | Boustany et al. | 156/62.2 |
| 4,050,949 | A * | 9/1977 | Lundgren et al. | 106/643 |
| 4,323,625 | A * | 4/1982 | Coran et al. | 428/361 |
| 4,559,276 | A * | 12/1985 | Tezuka | 428/599 |
| 5,162,059 | A | 11/1992 | Rossi | 106/644 |
| 5,456,752 | A | 10/1995 | Hogan | 106/802 |
| 5,503,670 | A * | 4/1996 | Richard et al. | 106/643 |
| 5,571,628 | A | 11/1996 | Hackman | 428/605 |
| 5,628,822 | A * | 5/1997 | Hogan | 106/802 |
| 5,807,458 | A * | 9/1998 | Sanders et al. | 156/276 |
| 5,858,082 | A * | 1/1999 | Cruz et al. | 106/644 |
| 5,897,928 | A | 4/1999 | Sanders et al. | 428/36.92 |
| 5,981,630 | A * | 11/1999 | Banthia et al. | 524/8 |
| 6,080,234 | A | 6/2000 | Clavaud et al. | 106/644 |
| 6,235,108 | B1 | 5/2001 | Lambrechts | 106/644 |
| 6,478,867 | B1 | 11/2002 | Cheyrezy et al. | 106/644 |
| 6,723,162 | B1 * | 4/2004 | Cheyrezy et al. | 106/644 |
| 2003/0044592 | A1 | 3/2003 | Perez et al. | 428/294.7 |

FOREIGN PATENT DOCUMENTS

| | | | |
|---|---|---|---|
| JP | 64-045750 | * | 2/1989 |
| JP | 10-194802 | * | 7/1998 |
| WO | WO 99/58468 | * | 11/1999 |

OTHER PUBLICATIONS (http://www.reade.com/Conversion/wire_gauge.html, "Wire Gauge Conversion Chart", Reade Advanced Materials).*
Machine Translation of JP 10-194802, Mitani et al.*
WO 99/58468, Cheyrezy et al., Hand Translation into English.*
JP 64-04570, Takizawa et al., Hand Translation into English.*

* cited by examiner

*Primary Examiner*—D. Lawrence Tarazano
*Assistant Examiner*—Brett A Crouse
(74) *Attorney, Agent, or Firm*—C. G. Mersereau; Nikolai & Mersereau, P.A.

(57) ABSTRACT

Concrete and mortar composites can be made with two or more sizes of fibers therein. The different sized fibers can be used to adjust the toughness and reliability of the composite material. The different sized fibers can also be used to increase the deflection of concrete or mortar compositions. The variable length of fibers provide for smaller fibers to exist in corners for more strength in smaller spaces. Different mixes of sizes of fibers can also adjust the stiffness of a concrete or mortar composite material. The fibers can be made from a variety of materials, lengths, shapes, aspect ratios or diameters. The fibers can make up variable portions of the composition. Mixing different aspect ratios of fibers together can be used to prevent clumping or balling of the fibers. Mixing of different modulus of elasticity fibers in different ratios can add to the toughness and strength of the composite.

23 Claims, 5 Drawing Sheets

| MIXTURE PROPORTIONS AND FRESH CONCRETE PROPERTIES | | | | | |
|---|---|---|---|---|---|
| | MIXTURES | | | | |
| | 1 | 2 | 3 | 4 | |
| SAND (-3/8) | 1450 | 1450 | 2600 | 2600 | PCY |
| ROCK (-1/2) | 1450 | 1450 | | | PCY |
| CEMENT TYPE 1 | 611 | 611 | 750 | 750 | PCY |
| FLYASH | 94 | 94 | 150 | 150 | PCY |
| WATER | 324 | 324 | 414 | 414 | PCY |
| W/C | .46 | .46 | .46 | .46 | |
| FIBER 1.60 INCH | 66 | 22 | | 44 | PCY |
| FIBER .75 INCH | | 22 | | 44 | PCY |
| FIBER .50 INCH | | 22 | 132 | 44 | PCY |
| SLUMP | .75 | .75 | 1.50 | 1.75 | INCH |
| CONCRETE TEMP | 80 | 83 | 87 | 92 | DEG F |
| AMBIENT TEMP | 72 | 72 | 72 | 72 | DEG F |

*Fig. 1*

| COMPRESSIVE STRENGTH | | | | |
|---|---|---|---|---|
| MIXTURE CYL. | CONCRETE | | MIXTURE 1 | |
| 1.1 | 7604 | PSI | PCY | FIBER |
| 1.2 | 8280 | PSI | 66 | 1600 |
| 1.3 | 7962 | PSI | | |
| AVG. | 7949 | PSI | | |
| STD. DEV. | 338 | PSI | | |
| C. V. % | 4 | PSI | | |

| MIXTURE CYL. | CONCRETE | | MIXTURE 2 | |
|---|---|---|---|---|
| 2.1 | 8519 | PSI | PCY | FIBER |
| 2.2 | 8559 | PSI | 22 | 1600 |
| 2.3 | 8439 | PSI | 22 | .75 |
| AVG. | 8506 | PSI | 22 | .50 |
| STD. DEV. | 61 | PSI | | |
| C. V. % | 1 | PSI | | |

| MIXTURES | | RATIOS |
|---|---|---|
| 2/1 | CONCRETE | 1.07 |

| MIXTURE CYL. | MORTAR | | MIXTURE 3 | |
|---|---|---|---|---|
| 3.1 | 6449 | PSI | PCY | FIBER |
| 3.2 | 6568 | PSI | 132 | 500 |
| 3.3 | 6330 | PSI | | |
| AVG. | 6449 | PSI | | |
| STD. DEV. | 119 | PSI | | |
| C. V. % | 2 | PSI | | |

| MIXTURE CYL. | MORTAR | | MIXTURE 4 | |
|---|---|---|---|---|
| 4.1 | 6449 | PSI | PCY | FIBER |
| 4.2 | 6529 | PSI | 44 | 1600 |
| 4.3 | 6568 | PSI | 44 | .75 |
| AVG. | 6515 | PSI | 44 | .50 |
| STD. DEV. | 61 | PSI | | |
| C. V. % | 1 | PSI | | |

| MIXTURES | | RATIOS |
|---|---|---|
| 4/3 | MORTAR | 1.01 |

*Fig. 2*

| AVERAGE RESIDUAL STRENGTH DATA |||||||||
|---|---|---|---|---|---|---|---|---|
| MIXTURE -BEAM | DEFLECTION (INCH) AT LOAD (LBS) |||| BREADTH -INCH | DEPTH - INCH | ARS ||
| | .020 | .030 | .040 | .050 | | | PSI | MPa |
| CONCRETE SINGLE-FIBER TEST BEAMS |||||||||
| 1.1 | 1521 | 1482 | 1442 | 1386 | 4.000 | 4.100 | 260 | 1.80 |
| 1.2 | 2199 | 2082 | 2043 | 1986 | 3.892 | 4.027 | 395 | 2.73 |
| 1.3 | 2220 | 2267 | 2258 | 2213 | 3.967 | 4.087 | 406 | 2.80 |
| 1.4 | 1118 | 1083 | 1046 | 1004 | 3.892 | 4.028 | 202 | 1.39 |
| 1.5 | 1537 | 1470 | 1444 | 1432 | 3.959 | 4.066 | 270 | 1.86 |
| | | | | | | AVG. | 306 | 2.11 |
| | | | | | | STD. DEV. | 90 | .62 |
| | | | | | | % C. V. | 29 | 29 |
| CONCRETE MULTI-FIBER TEST BEAMS |||||||||
| 2.1 | 1045 | 1076 | 1031 | 980 | 4.018 | 4.067 | 187 | 1.29 |
| 2.2 | 745 | 689 | 655 | 631 | 4.056 | 4.026 | 124 | .86 |
| 2.3 | 986 | 934 | 890 | 876 | 4.072 | 4.101 | 161 | 1.11 |
| 2.4 | 1442 | 1325 | 1170 | 1020 | 3.922 | 4.035 | 233 | 1.61 |
| 2.5 | 1085 | 1056 | 1044 | 999 | 4.027 | 4.022 | 193 | 1.33 |
| | | | | | | AVG. | 180 | 1.24 |
| | | | | | | STD. DEV. | 40 | .28 |
| | | | | | | % C. V. | 22 | 22 |
| MORTAR SINGLE-FIBER TEST BEAMS |||||||||
| 3.1 | 915 | 788 | 688 | 573 | 4.071 | 4.041 | 134 | .92 |
| 3.2 | 559 | 488 | 425 | 361 | 3.972 | 4.041 | 85 | .58 |
| 3.3 | 653 | 565 | 505 | 420 | 4.002 | 4.039 | 98 | .68 |
| 3.4 | 661 | 571 | 521 | 465 | 3.968 | 4.025 | 104 | .71 |
| 3.5 | 1091 | 946 | 864 | 798 | 4.095 | 4.030 | 167 | 1.15 |
| | | | | | | AVG. | 117 | .81 |
| | | | | | | STD. DEV. | 33 | .23 |
| | | | | | | % C. V. | 28 | 28 |
| MORTAR MULTI-FIBER TEST BEAMS |||||||||
| 4.1 | 1088 | 1044 | 993 | 952 | 4.032 | 4.051 | 185 | 1.28 |
| 4.2 | 1354 | 1293 | 1196 | 1098 | 4.063 | 4.007 | 227 | 1.57 |
| 4.3 | 953 | 905 | 873 | 835 | 4.055 | 4.027 | 163 | 1.12 |
| 4.4 | 975 | 935 | 860 | 821 | 4.025 | 4.017 | 166 | 1.14 |
| 4.5 | 1115 | 1061 | 992 | 951 | 4.060 | 4.013 | 189 | 1.30 |
| | | | | | | AVG. | 186 | 1.28 |
| | | | | | | STD. DEV. | 26 | .18 |
| | | | | | | % C. V. | 14 | 14 |

*Fig. 3*

| CRACK ANALYSIS ||||||||
|---|---|---|---|---|---|---|---|
| MIXTURE -BEAM | DEF P X .0001 | PEAK LOAD (LBS) AT DEFL. ||| BRDTH -INCH | DEPTH - INCH | ARS 27 PSI | ARS CH PSI |
| | | LOAD P | LOAD CH | LOAD 27 | | | | |
| CONCRETE SINGLE FIBER ||||||||
| 1.1 | 16 | 3660 | 890 | 2770 | 4.00 | 4.10 | 574 | 79 |
| 1.2 | 18 | 3310 | 1031 | 2279 | 3.89 | 4.03 | 531 | 98 |
| 1.3 | 16 | 3180 | 706 | 2474 | 3.97 | 4.09 | 512 | 64 |
| 1.4 | 14 | 3000 | 486 | 2514 | 3.89 | 4.03 | 524 | 46 |
| 1.5 | 12 | 3177 | 497 | 2680 | 3.96 | 4.07 | 537 | 46 |
| | | | | | | AVG. | 536 | 67 |
| | | | | | | STD. DEV. | 23 | 22 |
| | | | | | | C. V. % | 4.4 | 33.7 |
| CONCRETE MULTI-FIBER ||||||||
| 2.1 | 12 | 3500 | 744 | 2756 | 4.02 | 4.07 | 565 | 67 |
| 2.2 | 58 | 2810 | 1482 | @11/27 | 4.06 | 4.03 | | |
| 2.3 | 10 | 3000 | 255 | 2745 | 4.07 | 4.10 | 503 | 22 |
| 2.4 | 10 | 3000 | 578 | 2422 | 3.92 | 4.04 | 509 | 54 |
| 2.5 | 51 | 3160 | 1442 | @5/27 | 4.03 | 4.02 | | |
| | | | | | | AVG. | 526 | 48 |
| | | | | | | STD. DEV. | 34 | 23 |
| | | | | | | C. V. % | 6.4 | 48.1 |
| MORTAR SINGLE-FIBER ||||||||
| 3.1 | 19 | 3050 | 641 | 2409 | 4.07 | 4.04 | 493 | 58 |
| 3.2 | 9 | 2500 | 718 | 1782 | 3.97 | 4.04 | 396 | 66 |
| 3.3 | 8 | 2500 | 445 | 2055 | 4.00 | 4.04 | 419 | 41 |
| 3.4 | 9 | 2791 | 844 | 1947 | 3.97 | 4.03 | 442 | 79 |
| 3.5 | 15 | 2588 | 294 | 2294 | 4.10 | 4.03 | 440 | 27 |
| | | | | | | AVG. | 438 | 54 |
| | | | | | | STD. DEV. | 36 | 21 |
| | | | | | | C. V. % | 8.2 | 38.2 |
| MORTAR MULTI-FIBER ||||||||
| 4.1 | 10 | 2500 | 531 | 1969 | 4.03 | 4.05 | 405 | 48 |
| 4.2 | 8 | 2500 | 284 | 2216 | 4.06 | 4.01 | 434 | 26 |
| 4.3 | 9 | 2418 | 860 | @13/27 | 4.06 | 4.03 | | |
| 4.4 | 6 | 2500 | 432 | 2068 | 4.03 | 4.02 | 422 | 40 |
| 4.5 | 8 | 3000 | 1213 | 1787 | 4.06 | 4.01 | 439 | 111 |
| | | | | | | AVG. | 425 | 56 |
| | | | | | | STD. DEV. | 15 | 38 |
| | | | | | | C. V. % | 3.5 | 66.9 |

*Fig. 4*

VARIED LENGTH FIBERS IN A BRITTLE MATERIAL

BACKGROUND OF THE INVENTION

A. Field of the Invention

This invention relates to the reinforcement of castable compositions such as concrete or mortar mixtures by fibers having a plurality of different aspect ratios and lengths for improving the mixing of the different size fibers without clumping and improving the toughness of the composition.

B. Description of the Related Art

Steel fibers and synthetic fibers have been added to concrete and mortar for inhibiting the start of cracking and for inhibiting crack propagation and retarding crack widths. Fibers of uniform length have also been added to concrete and mortar for increasing the toughness of the composition for large deflections after the start of cracking. However there has been no combination of different metal fiber aspect ratios to improve the toughness of compositions at small deflections particularly after cracking has started with shorter length fibers while still improving the toughness of the concrete or mortar with longer fibers.

A problem with adding fibers to a concrete or mortar mixture is balling where the fibers of one length will ball together and they thereafter cannot be easily separated. They become entangled and cannot be separated. The mixing of fibers of different lengths in desired proportions then becomes even more difficult as the fibers of different lengths when shipped separately clump together and can't be separated. Mixing of the fibers in the concrete or mortar will compact the entangled fibers making the balling worse.

Some attempts to add fibers of higher aspect ratios without balling used fibers of the same size glued together at the edges with water-soluble glue. Gluing the fibers together in effect presented a lower aspect ratio fiber for easier mixing. When mixed with concrete the fibers got separated without a balling problem. However, only one size fiber was added to the mixture by this method.

Various mixing sequences and techniques have been developed to mix fibers of one size into concrete to avoid balling. However the sequences are highly labor intensive or involve additional equipment, or additional mixing time to try to avoid balling. This adds to the costs and if not properly performed balling still occurs.

It is desired to be able to select a mixture of the specified lengths of fibers and to mix them into concrete or mortar without clumping or balling to provide a homogeneous mixture resulting in the desired toughness for the end product.

SUMMARY OF THE INVENTION

A plurality of aspect ratios of fibers mixed in concrete or mortar will provide a higher toughness for the composite than concrete or mortar without fibers or for concrete or mortar with fibers of one length. Combining a plurality of different aspect ratios in a composite adds toughness at different deflections.

In order to avoid balling or clumping of fibers in a container of fibers, and in the resultant mixture of fibers with concrete or mortar, low aspect ratio fibers are added to the container as high aspect ratio fibers are simultaneously added. It has been found that having low aspect ratio fibers mixed in with high aspect ratio fibers will prevent balling of the fibers in the container. The mixed high and low aspect ratio fibers can then be easily removed from the container in an unentangled state and added to the concrete or mortar for mixing therewith. It has been found that adding the mixed low aspect ratio fibers and high aspect ratio fibers to a concrete or mortar allows for a homogeneous mixture without balling in the concrete or mortar. The mixing was found to be homogeneous with the use of both high and low shear mixers. The resultant mixture of fibers and concrete or mortar can be used to provide designer toughnesses at different deflection for making different products.

OBJECTS OF THE INVENTION

It is an object of the invention to prevent balling of fibers in a container, such fibers are to be added to a concrete or mortar mixture.

It is an object of the invention to prevent balling of fibers in a concrete or mortar mixture.

It is an object of the invention to provide a homogenous mixture of different aspect ratio fibers in a concrete or mortar mixture.

It is an object of the invention to mix low aspect ratio fibers with higher aspect ratio fibers to prevent balling of fibers in a container of fibers.

It is an object of the invention to mix low aspect ratio fibers with higher aspect ratio fibers to prevent balling of fibers with each other in a concrete or mortar mixture.

It is an object of the invention to increase the toughness of concrete or mortar mixtures over a deflection range using a combination of fiber aspect ratios.

It is an object of the invention to provide flexural and crack control.

It is an object of the invention to provide a more consistent and reliable toughness in concrete and mortar composites by the use of a plurality of aspect ratios of fibers added to the composition.

It is an object of the invention to use the composite material in field and factory cast objects.

It is an object of the invention to relate the fiber length to crack width and aggregate gradation.

It is an object of the invention to design the composition with fiber aspect ratios related to the end performance of the article made by fiber-reinforced concrete or mortar.

Other objects, advantages and novel features of the present invention will become apparent from the following detailed description of the invention when considered in conjunction with the accompanying drawing.

BRIEF DESCRIPTION OF THE DRAWINGS

FIG. 1 is a table showing the mixture proportions for concrete and mortar in the test.

FIG. 2 is a table showing the compressive strength of the concrete and mortar in the test.

FIG. 3 is a table showing the average residual strength of the concrete and mortar in the test.

FIG. 4 is a table showing the crack analysis of the concrete and mortar in the test.

DETAILED DESCRIPTION OF THE INVENTION

Figure 5:
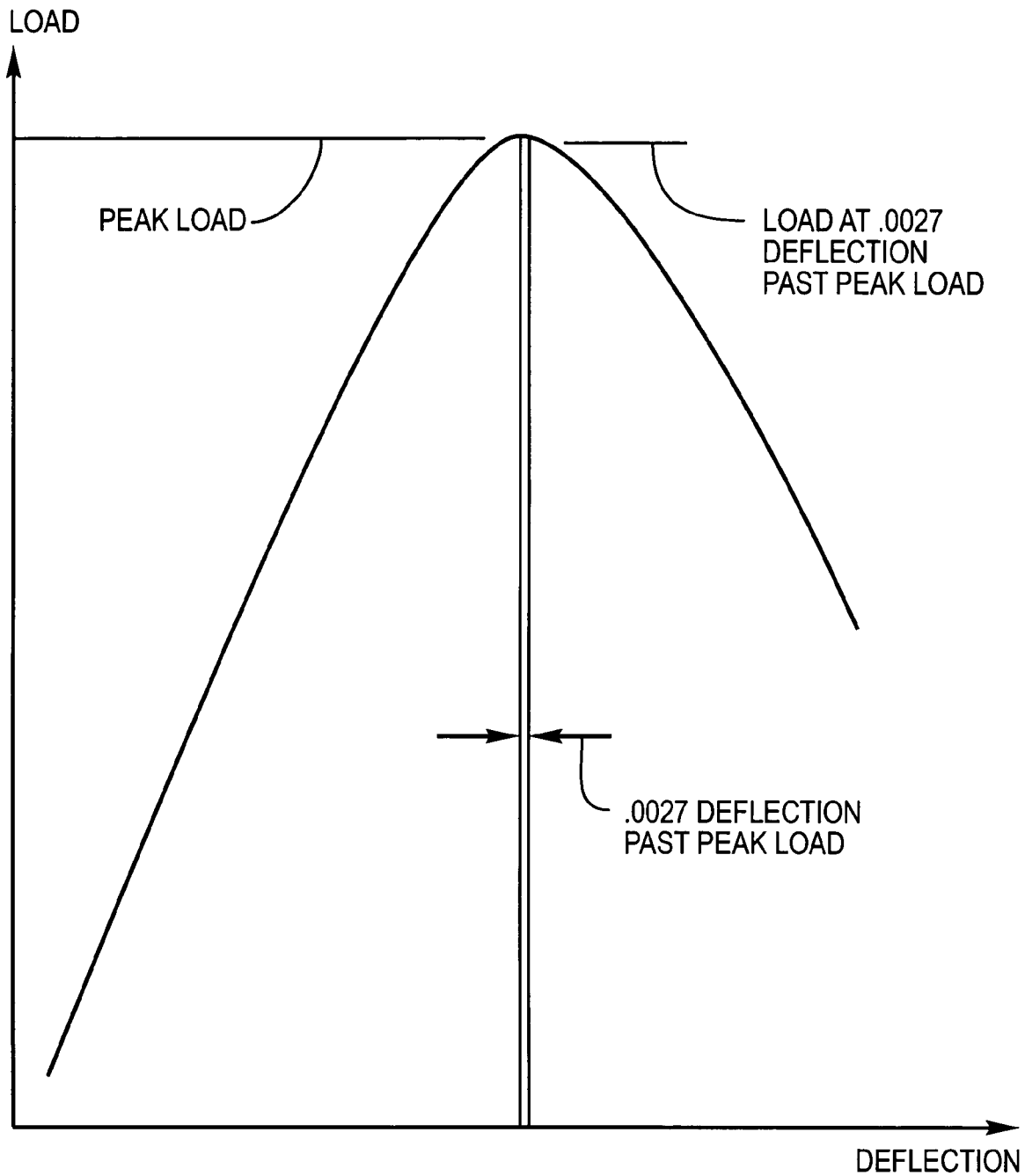
FIG. 5 is a graph of a toughness curve.

With no fibers in concrete there is zero toughness. Once bending cracking strength is exceeded the crack continues all the way though the concrete and there is a catastrophic failure.

Toughness as used herein is defined as the area under a load deflection curve and has specified deflections as a result of a load or a load carrying capability after a crack.

When short fibers are used in concrete, they prevent crack initiation and micro-crack growth during concrete hardening, physical loading, and thermal cycling. Short fibers in concrete improve the toughness of the concrete because the cracks propagating in the concrete are blocked by the fibers, which hold the concrete together.

Longer fibers in concrete provide even more toughness because the longer fibers stop even more cracks from propagating though the concrete. With short fibers it is easier for the cracks to find a path through the concrete without being stopped by the fibers by following a path of least resistance. The longer fibers control the propagation of large cracks by bridging the cracks and holding the concrete or mortar together.

Uniform length fibers can yield a specified toughness at a specified deflection. By using a plurality of different length fibers with different aspect ratios the toughness can be specified over a spectrum of different deflections starting from small deflections and going to large deflections. By using fibers of various defined lengths and diameters (having different aspect ratios) the toughness can be controlled in different portions of the deflection range such that composites can be designed for specified uses requiring different toughnesses at different deflections. As an example, this may be important where vibrations in the concrete create different toughness demands due to a spectrum of deflections or loads.

By combining a plurality of different length fibers in the concrete the spectrum of fiber lengths increases the toughness over a greater range of deflections with more certainty.

Testing has been conducted to show that a combination of different size fibers in concrete and mortar will provide higher toughness reliability at small deflections as the concrete or mortar has just cracked.

In order to test the toughness in concrete or mortar, the test samples were cracked on a steel plate by using American Society for Testing Materials procedure ASTM C 1399-01. At the point of cracking there is a lot of energy released. The steel plate absorbs the energy at the point of cracking without letting the cracks propagate due to the load being applied by the test equipment. The beam is then reloaded or tested without the steel plate for toughness of a cracked beam by using American Society for Testing Materials procedure ASTM C 1399-01. The American Society for Testing Materials procedure ASTM C 1399-01 paper is attached hereto and incorporated herein by reference.

Testing was carried out using two different mixtures of concrete and two different mixtures of mortar.

As shown in FIG. 1 a first mixture of concrete was mixed to provide concrete for making test beams. As the table shows the concrete mixture was the same for the first and second mixtures except that in the first mixture 66 pounds per cubic yard of steel fibers were added to the mixture. The fibers were 1.6 inches long and the ends were bent upward at a 30 degree angle at each end, the bent up portion being about 0.125 inch long. The fibers being made from wire having a diameter of about 0.04 inches and flattened in the straight center portion between the ends. Although the steel fibers as described were used in the testing any fibers may be used and the fibers may be straight, bent or have other configurations.

In the second mixture steel fibers of three different lengths were used. Twenty-two pounds of 1.60-inch fibers, twenty-two pounds of 0.75-inch fibers and twenty-two pounds of 0.50-inch fibers were used. The ⅓, ⅓, ⅓ mixtures of the fibers may be varied to provide other ratios, and other lengths of fibers may be used. Further two or more different lengths of fibers may be used rather than just three different lengths. As before the fibers were made from wire having bent upward ends but could be straight or have other shapes, aspect ratios, or gauges.

In both the first and second mixtures the aggregate was screened for 0.50-inch rocks and the sand screen was 0.250-inches.

Similarly two mixtures of mortar were mixed for testing. The mortar generally having more sand and no rock compared to the concrete mixture, the third mixture being the same as the fourth mixture except for the content of steel fibers. In the third mixture 132 pounds of 0.5-inch fibers were added. In the fourth mixture three different lengths of fibers were added. The fibers added were 44 pounds of 0.5-inch fibers, 44 pounds of 0.75-inch fiber and 44 pounds of 1.6-inch fibers per cubic yard of mortar. As with the concrete mixtures the types and kinds of fibers, their lengths, shapes and ratios thereof may be varied for different mixtures.

The testing of the beams was standardized as per ASTM standards as outlined in ASTM C 1399 which paper is attached hereto and made a part hereof by reference.

As shown in FIG. 2 three cylinders were prepared for each mixture and tested for comparative strength. Notice that the one fiber length standard deviation and coefficient of variation are much higher for the one fiber concrete mixture and the one fiber mortar mixture than for the three-fiber mixtures, indicating that better tolerances of finished product can be produced using more than one fiber in the mixtures.

As shown in FIG. 3 the Average Residual Strength for each of the 5 beams tested for each mixture is shown. The load in pounds at 0.020-inches, 0.030-inches, 0.040-inches and 0.050-inches of deflection is used using the test method of ASTM C-1399 for both the concrete mixture and the mortar mixture. The single fiber length concrete and the single fiber mortar Average Residual Strength is higher at each deflection but the standard deviation is higher as is the coefficient of variation again showing that the reliability of the multi-fiber mixture is higher.

As shown in FIG. 4 the crack analysis for the Average Residual Strength for each of the 5 beams tested for each mixture is shown. The load in pounds at the maximum load and at 0.0027 inches deflection from the maximum load is measured using the test method of ASTM C-1399 for both the concrete mixtures and the mortar mixtures. The single fiber length concrete and the single fiber mortar Average Residual Strength is higher at each deflection but the standard deviation is higher as is the coefficient of variation again showing that the reliability of the multi-fiber mixture is higher.

FIG. 5 shows a typical maximum load curve for an ASTM C-1399 test and shows the portion of the curve being tested.

For some products or placement methods smaller length fibers may need to be used. Smaller length fibers and lower aspect ratio fibers are easier to mix in the concrete or mortar. The variable length fibers in a composition allow for smaller fibers to exist in corners to provide more strength in thinner or smaller spaces.

Different length fibers and different mixes of fiber lengths in the concrete and mortar will produce different properties. Strength, smaller deflections, and smaller crack sizes are all associated with different fiber lengths in concrete and mortar mixtures.

Different fiber lengths and mixtures of different fiber lengths provide different toughness to both concrete and mortar mixtures. There is a correlation between fiber lengths, maximum aggregate size and crack width. Changes to shorter fibers or mixes of different size fibers may improve the anchoring or resistance in minimal crack widths to increase toughness at specified deflections.

Two or more lengths of fibers in a mortar or cement composite are better than one length because it changes the toughness graph from the first crack to where the toughness is normally measured. Using different combinations of different lengths of fibers in mortar or concrete compositions allows the toughness of the composite to be varied based on the fiber lengths and ratios thereof in the composite.

By tailoring the amount of fibers in a concrete or mortar composition the properties of the composition can be modified to provide desired properties. With a different type spectrum of fiber lengths to chose from the toughness and behavior of the composite changes. By changing the mix of sizes of fibers it is possible to select a composite with small width cracks, large width cracks or no cracks for a particular use.

The aspect ratio of a fiber is proportional to the tangle-ability of the fiber. As can be readily understood, an aspect ratio of 1, describing a sphere, provides no opportunity for tangling. As the aspect ratio increases there will be a point where tangling will begin. If only low aspect ratio fibers are used, below the aspect ratio when tangling begins, no tangling will occur in the fibers to be added to the concrete or mortar and no tangling or balling will occur in the concrete or mortar and fiber mixture.

If an aspect ratio is reached where tangling occurs, the tangling or balling of the fibers will prevent the fibers from being homogeneously disbursed throughout the concrete or mortar mixture.

It has been found that when a mixture of low aspect ratio non-tangled fibers is mixed with high aspect ratio tangled fibers, the combination, in the right proportions, will yield non-entangled fibers which can be added to the concrete or mortar mixture yielding a homogeneous mixture of fibers in the concrete or mortar without balling or clumping.

For example 4.375 inch long fibers with a diameter of 0.040 inches having an aspect ratio of 109, which would by itself experience clumping, is combined with 1.6 inch length fibers with a diameter of 0.040 inches having an aspect ratio of 40, which would by itself not experience clumping, is further combined with 0.75 inch length fibers with a diameter of 0.040 inches having an aspect ratio of 19 which would by itself not experience clumping, the combination in the right ratios will not experience clumping.

In order to achieve a mixture which will not experience clumping the various aspect ratio fibers have to be added to a container and mixed together by adding, for example, three 19 aspect ratio fibers, two 40 aspect ratio fibers and one 110 aspect ratio fibers to the container and then repeating the process until the container is full. In this manner the fibers with the large aspect ratios are not allowed to clump together since they are mixed in with the low aspect ratio fibers, which prevent clumping. By carefully selecting the length and aspect ratios of the fibers, a container of mixed aspect ratio fibers fitting the desired properties of toughness for the product to be made can be obtained. The fibers can then be added to and mixed with the concrete or mortar to form a homogeneous mixture without clumping or balling.

There are many different combinations of large and small aspect ratio fibers, which may be used, such that the mixed fibers will not ball up. Various combinations of aspect ratios and percentages of such fibers in the mix may be tried to determine which combinations yield fibers which will clump and which combinations will not clump. Mixtures of two or more different aspect ratios may be mixed together to yield a mixture, which will be tangle free.

It should be understood that many different types of fibers may be used. The fibers may be aluminum, carbon steel, bright basic wire, stainless steel or other metals. The fibers may also be synthetic fibers such as polyolefin or polypropylene. The properties of the concrete or mortar will change with the selection of different fibers or mixes of fibers. The mixes of types of fibers may be chosen on the basis of cost benefit analysis where strength and cost are factors. For example, if all of the fibers selected are steel fibers, there may be shorter fibers with low aspect ratios used to prevent balling which have a lower modulus of elasticity and are of lower tensile strength, mixed in with longer fibers with a higher aspect ratio of more costly high modulus of elasticity fibers of a higher tensile strength to provide the composite material. The ratios of the mixes of different types, lengths, and aspect ratios of fibers can be chosen with cost, strength, non-entanglement and designer toughness factors in mind.

Obviously, many modifications and variations of the present invention are possible in light of the above teaching. It is therefore to be understood that, within the scope of the appended claims, the invention may be practiced otherwise than as specifically described.

What is claimed is:

1. A mixture of fibers for a composite material comprising:
   a plurality of fibers of a first aspect ratio which becomes entangled when mixed together and a plurality of fibers of at least one additional aspect ratio lower than the first aspect ratio, mixed together in a specified ratio such that the combination of fibers will not experience entangling.

2. A mixture of fibers for a composite material as in claim 1 wherein,
   the fibers are mixed with a composite material such that the fibers do not experience entangling in the composite material.

3. A mixture of fibers for a composite material as in claim 2 wherein,
   the composite material is concrete.

4. A mixture of fibers for a composite material as in claim 2 wherein,
   the composite material is mortar.

5. A mixture of fibers for a composite material as in claim 1 wherein,
   the fibers are bright basic wire.

6. A mixture of fibers for a composite material as in claim 1 wherein,
   the fibers are polypropylene.

7. A mixture of fibers for a composite material as in claim 1 wherein,
   the fibers have a straight center portion and are bent 30 degrees at each end.

8. A mixture of fibers for a composite material as in claim 1 wherein,
   the fibers have a first aspect ratio with a length of 1.6 inches,
   the fibers have a second aspect ratio with a length of 0.75 inches,
   the fibers have a third aspect ratio with a length of 0.5- inches.

9. A mixture of fibers for a composite material as in claim 1 wherein,
   the ratios of the of different aspect ratio fibers used are equal by weight.

10. A mixture of fibers for a composite material as in claim 1 wherein,
    the plurality of fibers of the at least one aspect ratio have a higher modulus of elasticity than the other fibers used in the composite material.

11. A mixture of fibers for a composite material obtained by the steps comprising, a) obtaining fibers of a first aspect ratio which experiences entangling when mixed together,
b) obtaining fibers of at least one additional aspect ratio lower than the first aspect ratio,
c) adding at least one fiber of the first aspect ratio to a container, and then adding at least one fiber of at least one additional aspect ratio to the container such that a specified ratio of fibers of different aspect ratios are added to the container,
d) repeating step c until the desired number of fibers are in the container such that the fibers in the container will not entangle.

12. A mixture of fibers for a composite material as in claim 11 with the additional step of,
mixing the fibers from the container into a composite material such that the fibers will not entangle in the composite material,
curing the composite material.

13. A mixture of fibers for a composite material as in claim 12 with the additional step of,
determining the ratio of the length of the different aspect ratio fibers to provide different properties of a mortar before mixing the fibers in the composite mixture.

14. A mixture of fibers for a composite material as in claim 12 with the additional step of,
the at least one aspect ratio fiber has a different modulus of elasticity fiber than the rest of the fibers in the mixture.

15. A mixture of fibers for a composite material as in claim 14 wherein the higher modulus of elasticity fiber has the highest aspect ratio.

16. A mixture of fibers for a composite material as in claim 11 wherein,
the composite mixture being concrete.

17. A mixture of fibers for a composite material as in claim 11 wherein,
the a composite mixture being mortar.

18. A mixture of fibers for a composite material as in claim 11 with the additional step of,
bending the ends of the fibers before adding the fibers to the container.

19. A mixture of fibers for a composite material as in claim 11 wherein,
step c includes, adding three different aspect ratios fibers in equal portions by weight, wherein,
a first aspect ratio fiber has a length of 1.6 inches,
a second aspect ratio fiber has a length of 0.75 inches,
a third aspect ratio fiber has a length of 0.5 inches.

20. A mixture of fibers for a composite material obtained by the steps comprising,
a) obtaining fibers of a first aspect ratio which experiences entangling when mixed together,
b) obtaining fibers of at least one additional aspect ratio which is smaller than the first aspect ratio,
c) adding at least one fiber of the first aspect ratio to a composite mixture, and then adding at least one fiber of at least one additional aspect ratio to the composite mixture such that a specified ratio of fibers of different aspect ratios are added to the composite mixture,
d) repeating step c until the desired number of fibers are in the composite mixture such that the fibers in the container will not entangle.

21. A mixture of fibers for a composite material as in claim 20 having,
the composite mixture being concrete.

22. A mixture of fibers for a composite material as in claim 20 having,
the composite mixture being mortar.

23. A mixture of fibers for a composite material as in claim 20 wherein,
an at least one additional aspect ratio fiber having a higher modulus of elasticity.

\* \* \* \* \*